United States Patent [19]
Hatam-Tabrizi

[11] Patent Number: 5,825,585
[45] Date of Patent: Oct. 20, 1998

[54] LATERALLY CONSTRAINED AND DAMPED MOUNT FOR A HARD DISK DRIVE

[75] Inventor: Shabab Hatam-Tabrizi, Los Altos, Calif.

[73] Assignee: Maxtor Corporation, San Jose, Calif.

[21] Appl. No.: 593,683

[22] Filed: Jan. 30, 1996

Related U.S. Application Data

[63] Continuation of Ser. No. 148,196, Nov. 3, 1993, abandoned.

[51] Int. Cl.[6] ............................ G11B 33/14; G11B 17/08
[52] U.S. Cl. ...................... 360/97.02; 360/98.07
[58] Field of Search ............. 360/97.01, 97.02, 360/97.03, 99.08, 98.07, 97.04; 369/263; 310/67 R, 51, 91

[56] References Cited

U.S. PATENT DOCUMENTS

| | | | |
|---|---|---|---|
| 5,021,905 | 6/1991 | Sleger | 360/97.01 |
| 5,179,483 | 1/1993 | Lowe | 360/97.02 |
| 5,204,567 | 4/1993 | Kinoshita et al. | 310/91 |
| 5,276,572 | 1/1994 | Kinoshita et al. | 360/97.01 |
| 5,315,467 | 5/1994 | Yoshida | 360/106 |
| 5,326,611 | 7/1994 | Kishita et al. | 360/97.02 |
| 5,357,163 | 10/1994 | Minakuchi et al. | 310/67 R |
| 5,367,416 | 11/1994 | Cassette et al. | 360/97.02 |
| 5,430,589 | 7/1995 | Moir et al. | 360/98.07 |
| 5,430,590 | 7/1995 | Ainslie et al. | 360/98.07 |
| 5,504,637 | 4/1996 | Asada et al. | 360/98.07 |
| 5,517,375 | 5/1996 | Dion et al. | 360/98.07 |
| 5,675,452 | 10/1997 | Nigam | 360/97.02 |
| 5,675,456 | 10/1997 | Myers | 360/97.02 |

*Primary Examiner*—Allen Cao
*Attorney, Agent, or Firm*—Sheridan Ross P.C.

[57] ABSTRACT

An assembly that couples a spindle shaft to the cover of a hard disk drive. The disk drive has a cover that is attached to a baseplate. Extending from the baseplate is a spindle shaft which supports a hub and the magnetic disk of the drive unit. Also extending from the base is an actuator assembly that includes a motor, shaft and pivoting arms. A resilient shaft mount secures the ends of the spindle and actuator shaft to the cover of the assembly.

20 Claims, 3 Drawing Sheets

LATERALLY CONSTRAINED AND DAMPED MOUNT FOR A HARD DISK DRIVE

This is a continuation of application Ser. No. 08/148,196 filed Nov. 3, 1993, and now abandoned.

FIELD OF THE INVENTION

The present invention relates to the field of magnetic recording, particularly to hard disk drive assemblies and to methods and apparatus for securely mounting such assemblies within an enclosure.

BACKGROUND OF THE INVENTION

Hard disk drive memory systems have been used in the field of magnetic recording for storage of digital information for many years. In modern disk drive technology digital information is recorded on concentric memory tracks of a magnetic disk medium. The disks themselves are rotatably mounted on a spindle. Information is generally accessed (i.e., read/written) by one or more transducers which are located on the ends of actuator arms. The actuator arms rotate about an axis so as to radially position the transducers or heads over the surface of the disk. The disk too rotates about a spindle shaft which is driven by a electromagnetic motor. All of the components of a typical disk drive assembly—including the motor, disk, actuator and transducers—are enclosed within a low-contaminant housing.

Over the years, there has arisen a trend in the industry to construct hard disk assemblies in ever smaller dimensions or form factors. For instance, practitioners are currently attempting to develop a disk drive assembly that is compatible with PCMCIA memory card specifications. Such a disk drive would provide the magnetic recording industry with an extremely small memory card that could easily be plugged into a computer. A PCMCIA compatible disk drive assembly would also obviate the need for conventional hard disk drives which are usually mounted within the computers housing. Obviously, eliminating the relatively large physical dimension of a disk drive assembly from the interior space of the computers housing would be very desirable.

One of the additional design considerations of a portable disk drive memory card is a high tolerance to mechanical shock and vibration. The frequent manual handling of a PCMCIA compatible disk drive card would subject the recording assembly to considerable shock, as might occur when the card is transported or dropped. By way of example, accidentally dropping the memory card would exert excessive gravitational forces on the disk drive which might destroy or damage the internal components of the drive. Additionally, the disk drive would be required to withstand the normal shock and vibration which occurs during the operation of a portable computing device. For instance, excessive vibrational loading commonly causes tracking errors in prior art hard disk drives.

Historically, one approach for increasing the resilience of the disk drive assembly has been to attach the spindle shaft, as well as the actuator shaft, to the cover and the baseplate of the enclosure. In this type of construction, screws are threadably secured to both the spindle and actuator shafts through openings in the cover and baseplate. There are, however, numerous drawbacks to this approach.

To begin with, screws typically require costly machining in order to match the inner cover support surfaces with the cover peripheral mating surfaces. Secondly, since the screw heads must be in physical contact with the cover, acoustic noise generated within the drive will automatically be coupled to the cover, and thereafter to the spindle and actuator shafts.

Another problem is that screws commonly create lateral distortions that affect the alignment of the spindle and actuator shaft bearings. These lateral distortions, in turn, drastically reduce the useful life of the bearings while amplifying acoustic noise. Lastly, some type of atmospheric seal is generally required to prevent environmental debris from entering the drive assembly through the openings in the cover.

A number of methods have been used in the past to seal the cover openings. For instance, flat head screws are commonly used to secure the spindle and actuator shafts to the cover. Tape is then utilized to seal the openings. The use of tape as a sealant, however, can be problematic since it is prone to loss of its adhesive quality over time.

An alternative sealing method entails the use of elastomeric o-rings disposed at the fastener/cover interface, or inside the disk drive assembly at the shaft/cover interfaces. By design, the o-rings are compressed by the screws past their yield point such that the screw head makes physical contact with the drive cover. In this approach, it is mandatory that surface-to-surface contact is properly maintained between the screw head and the cover; otherwise the screw will tend to loosen when subjected to temperature fluctuations. When this happens the spindle and actuator shafts are not adequately supported and environmental debris can be introduced into the drive assembly housing. The accumulation of environmental debris, of course, is highly undesirable since it causes an increased wear rate on the disk which can lead to random signal modulation.

Moreover, because surface-to-surface contact is needed between the screw head and cover, drive noise is coupled from the drive assembly to the cover.

What is needed then is a solution to the numerous problems inherent in the prior art. As will be seen, the present invention provides an apparatus and method for mounting the spindle to the cover while solving the aforementioned problems. Further, the present invention achieves this result without compromising the structural integrity of the disk drive assembly.

SUMMARY OF THE INVENTION

A laterally constrained and damped mount for securing a spindle shaft and/or an actuator shaft to the enclosure of a hard disk drive is described. Among the advantages of the present invention include the ability to absorb external shock and vibrational loads without shearing or otherwise damaging the coupling between the enclosure and the spindle and/or actuator shafts. The dampening properties of the mount also drastically reduces the transmission of acoustic noise from the drive to the enclosure.

Since the present invention obviates the need for screws to secure the spindle and actuator shafts to the drive's housing, the attendant lateral distortions associated with using screws are also eliminated. Abolishing the use of screws for securing the spindle and/or actuator shafts to the enclosure also reduces the number of openings which must be drilled through the enclosure; thus greatly diminishing the amount of environmental debris introduced into the interior of the drive assembly.

Additionally, manufacturing costs are reduced since the invention obviates the need for exact machining tolerances at the cover/shaft interfaces.

In one embodiment, the present invention comprises a disk drive assembly with a cover that is attached to a baseplate. Extending from the baseplate is a spindle shaft which is coupled to a motor and also to an annular magnetic disk. An actuator assembly that includes an actuator motor, a shaft, and at least one pivotal actuator arm, is also mounted to the baseplate. Holes are provided through the center of the spindle and actuator shafts. The enclosing cover of the drive includes recessed regions centered above the spindle and actuator shafts. The elastomeric mounts are fitted into the holes of the spindle and actuator shafts with a portion of the mount protruding outward therefrom. The protruding portions are forcibly pressed into the cover recesses when the cover is secured to the baseplate. In this manner, the elastomeric mounts are compressed so as to fixedly mount the ends of the spindle and actuator shafts to the inside of the enclosure.

Thus, one object of the present invention to provide a mount for a hard disk drive that fixedly secures the spindle and actuator shafts to the enclosure while compensating for tolerances in the assembly.

It is a further object of the present invention to provide a mount for a disk drive assembly that can absorb external loads and increases the stiffness of the spindle and actuator shafts It is yet another object of the present invention to provide a method of mounting a disk drive unit within an enclosure that is both inexpensive and easy to assemble.

It is still another object of the present invention to provide a mount for a disk drive assembly which dampens vibrational load applied to the disk drive.

It is yet another object of the present invention to provide a mount for a disk drive assembly which dampens the transmission of acoustic noise from the drive to the enclosure.

It is a further object of the present invention to provide a mount for a disk drive assembly that does not induce lateral distortions between the spindle and/or actuator shafts and the enclosure to which they are fixedly secured.

It is yet another object of the present invention to provide a mount for a disk drive assembly that reduces the number of openings in the housing, thereby reducing the likelihood that environmental debris will be introduced into the drive assembly.

BRIEF DESCRIPTION OF THE DRAWINGS

The novel features believed characteristic to the invention are set forth in the appended claims. The invention itself, however, as well as other features and advantages thereof, will be best understood by reference to the detailed description that follows, read in conjunction with the accompanying drawings wherein:

DETAILED DESCRIPTION

A laterally constrained and damped mount that is suitable for fixedly securing a spindle shaft and/or an actuator shaft of a disk drive assembly to the surrounding enclosure is disclosed. In the following description, numerous specific details are set forth such as material types, dimensions, shapes, etc., in order to provide a thorough understanding of the present invention. It will be obvious, however, to one of ordinary skill in the art that the invention may be practiced without these specific details. In other instances, well-known structures and processing steps have not been described in detail in order to avoid unnecessarily obscuring the present invention.

Figure 1:
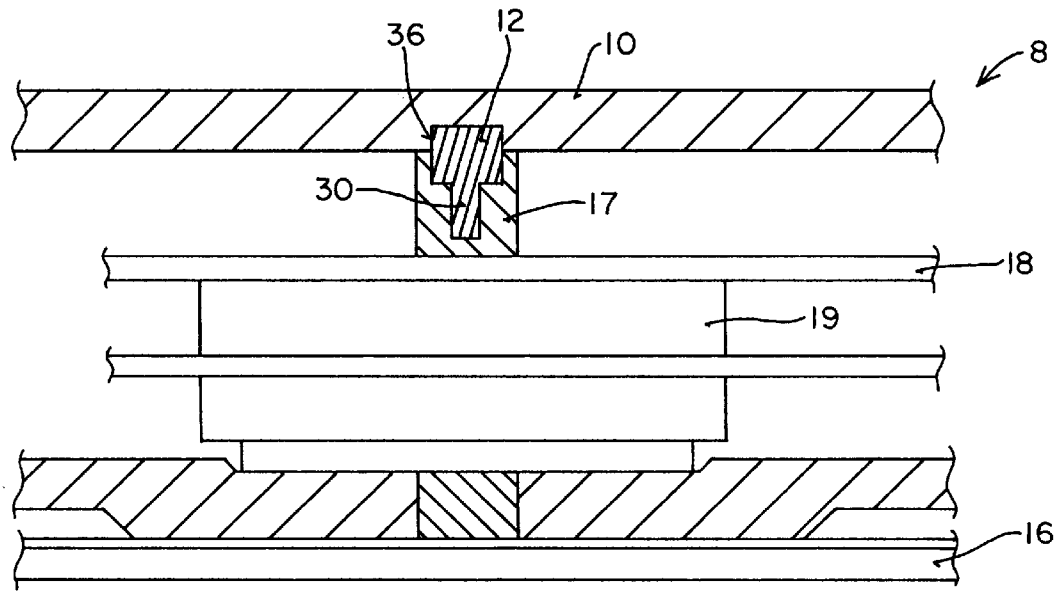
FIG. 1 is a cross-sectional view of the mount of the present invention, as used to secure the spindle of a typical disk drive assembly.

With reference to FIG. 1, a cross-sectional side view of a hard disk drive spindle assembly 8 is shown. Spindle assembly 8 typically comprises one or more magnetic disks 18 attached to a hub 19. Hub 19 rotates about a spindle shaft 17, most often, by means of bearings located at respective ends of shaft 17. An electric motor (not shown) including a stator, a rotor, and coil windings is generally disposed within or below hub 19 generates the rotational movement of hub 19 relative to spindle shaft 17 in response to an electric current.

During the manufacturing of assembly 8, spindle shaft 17 is mounted to the baseplate 16 utilizing any number of well-known mounting or fastening techniques. Later in the manufacturing process, the entire assembly is sealed within an enclosure by the attachment of cover 10 to baseplate 16. Most often, cover 10 is attached to baseplate 16 by screws which pass through holes drilled around the periphery of cover 10. These screws are threadably secured to baseplate 16 at corresponding peripheral locations. To prevent contamination of the interior of the enclosure, a gasket, or some other type sealant is disposed about the periphery of the enclosure between baseplate 16 and cover 10. Note that baseplate 16 and cover 10 typically comprise aluminum or a similarly rigid material (e.g., plastic) in order to protect the internal assembly components from outside environmental influences.

In one embodiment of the present invention, spindle shaft 17 includes an orifice 30 located at one end of shaft 17. Orifice 30 is disposed along a central, longitudinal axis of shaft 17. At a location directly above orifice 30, a recessed region 36 is provided in cover 10. Both orifice 30 and recessed region 36 may be manufactured by a variety of techniques such as machining, drilling, stamping, mold casting, etc.

In the embodiment of FIG. 1, the purpose of orifice 30 and recessed region 36 is to accommodate a mounting member 12, which preferably comprises an elastomeric material. During the process of assembling the disk drive unit, mounting member 12 is press-fit into orifice 30 and recessed region 36 so as to secure the position of shaft 17 within the drive's enclosure. In the case where member 12 comprises an elastomeric material, the process of attaching cover 10 to baseplate 16 causes the body of member 12 to be forcibly compressed within the space defined by orifice 30 and region 36.

With continuing reference to FIG. 1, spindle shaft 17 is shown coupled to cover 10 by mounting member 12. Mounting member 12 preferably comprises a resilient, elastomeric material that is sufficiently rigid to laterally constrain the spindle assembly when the drive is subjected to an external load, yet flexible enough to dampen environmental vibrations and acoustic noise. In a current embodiment, these criteria are met by the use of Butyl.

The deflection of the elastomer absorbs energy and reduces stresses in the assembly—particularly the shear stresses between the spindle shaft 17 and the cover 10. Coupling the spindle shaft 17 to the cover 10 also creates a shaft that is supported at both ends, as opposed to an unsupported shaft end which would produce a relatively weak cantilever beam. The present invention, therefore, provides a more rigid spindle shaft 17 member. Additionally, the elastomeric shaft mount 12 dampens any vibrational loads applied to the spindle assembly 8 and minimizes the transmission of acoustic noise from the spindle assembly 8 to the cover 10.

Practitioners in the art will appreciate that the compression of elastomeric member 12 improves the mount's ability to resist lateral displacements of shaft 17 with respect to cover 10. Such displacements may be caused, for instance, by routine mechanical shock and vibration.

The lateral constraining properties of the mount are further enhanced when elastomeric materials are employed which also have a high coefficient of surface friction. For example, elastomers containing rubber or polyurethane normally have an adequately high coefficient of friction so as to satisfy this criteria. Alternatively, member 12 may be coated with a highly frictional material, such as an adhesive, to further increase the lateral constraining properties of the invented mount.

It should be understood that the relative dimensions and geometric shapes shown in FIG. 1 are exemplary of one embodiment of the present invention only. Other embodiments may utilize different dimensions, shapes, materials, etc., to achieve substantially the same result.

Figure 2:
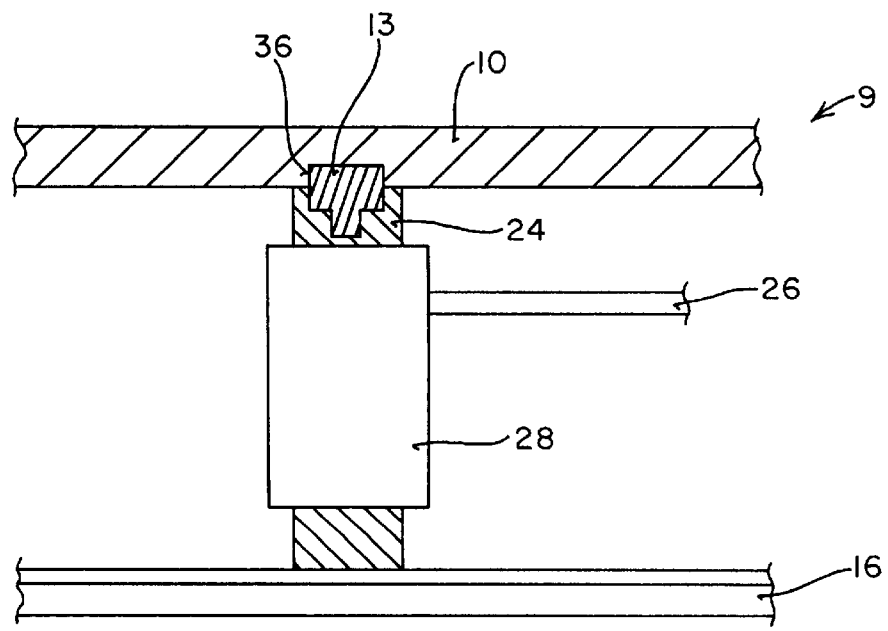
FIG. 2 is a cross-sectional view of the mount of the present invention, as used to secure the actuator shaft of a typical disk drive assembly.

With reference to FIG. 2, a cross-sectional side view of the hard disk drive actuator assembly 9 of the present invention is shown. The actuator assembly 9 includes an actuator 28, shaft 24 and pivoting arms 26. The actuator 28 includes an electric motor (not shown) that is coupled to actuator shaft 24. The actuator motor rotates actuator 28 to position a read/write head (not shown) that is located on the end of pivoting arm 26. The read/write head typically comprises one or more transducers which are used to access information from magnetic disk 18.

During the manufacturing of assembly 9, actuator 28 is mounted to baseplate 16 utilizing any number of well-known mounting or fastening techniques. Later in the manufacturing process the actuator assembly 9 is sealed within an enclosure by the attachment of cover 10 to baseplate 16. As shown in FIG. 2, actuator shaft 24 is coupled to cover 10 by mounting member 13. Members 10, 13 and 24 function to form the couple between the actuator shaft and cover in the same manner members 10, 12 and 17 form the couple in FIG. 1.

Figure 3:
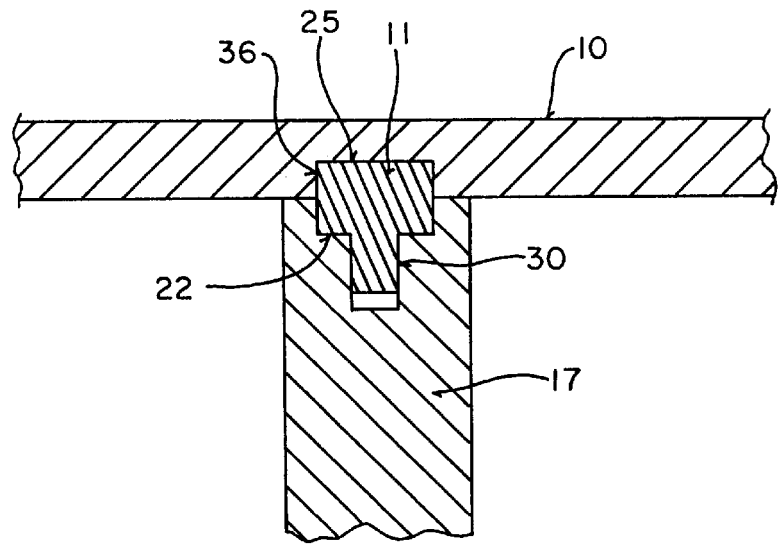
FIG. 3 is a cross-sectional view of one embodiment of the elastomeric mount of the present invention..
Figure 4:
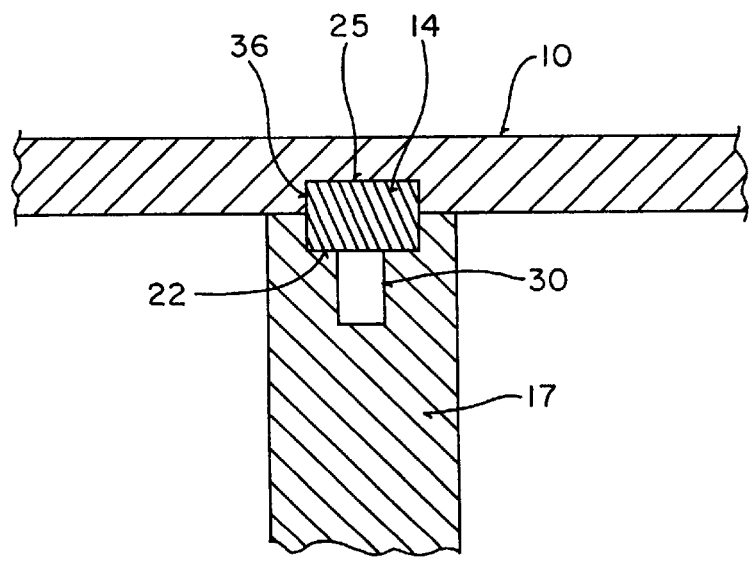
FIG. 4 is a cross-sectional view of another embodiment of the elastomeric mount of the present invention.
Figure 5:
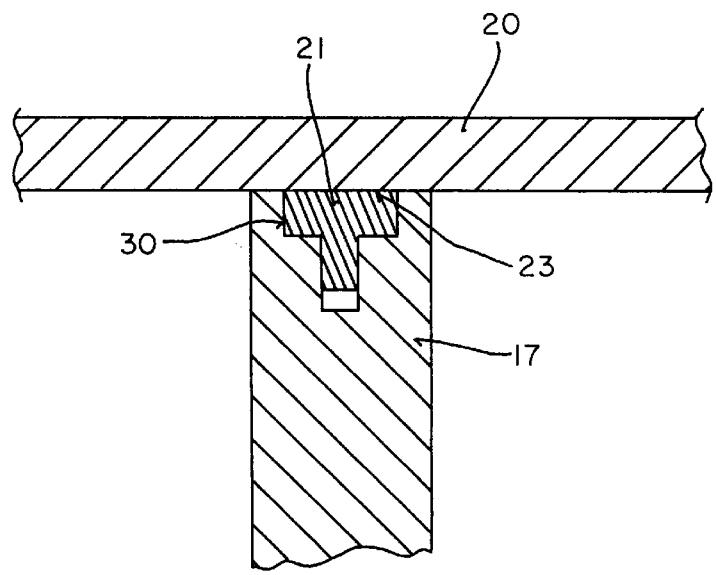
FIG. 5 is a cross-sectional view of yet another embodiment of the elastomeric mount of the present invention.

FIGS. 3, 4 and 5 disclose different embodiments of the present invention. The figures illustrate the embodiments as they relate to the spindle assembly 8 of FIG. 1. It should be noted, however, that the coupling methods presented in the embodiments are equally applicable to the actuator assembly 9 of FIG. 2.

In the embodiment of FIG. 3, spindle shaft 17 includes an orifice having a stepped cylindrical shape and a T cross-section. Orifice 30 is disposed along a central, longitudinal axis of shaft 17 and includes a seating surface 22. At a location directly above orifice 30, a recessed region 36 is provided in cover 10. The purpose of orifice 30 and recessed region 36 is to accommodate mounting member 11. Like orifice 30, mounting member 11 has a stepped cylindrical shape and a T cross-section.

The spindle shaft 17 is coupled to cover 10 by first placing mounting member 11 into orifice 30 such that it rests on surface 22. Mounting member 11 is then press-fit into orifice 30 and recessed region 36 so as to secure the position of shaft 17 within the drive's enclosure. In the case where member 11 comprises an elastomeric material, the process of attaching cover 10 to baseplate 16 causes the body of member 11 to be forcibly compressed within the space defined by orifice 30 and region 36.

With continuing reference to FIG. 3, spindle shaft 17 is shown coupled to cover 10 by mounting member 11. Mounting member 11 is preferably constructed from a resilient, elastomeric material that is sufficiently rigid to laterally constrain the spindle assembly when the drive is subjected to an external load, yet flexible enough to dampen environmental vibrations and acoustic noise. The mounting member 11 also compensates for any tolerances in the components and overall assembly of the drive unit. For example, if the spindle shaft 17 is less than the nominal dimension of the part, shaft mount 11 is compressed slightly less than normal when cover 10 is attached to baseplate 16. Thus, the invention provides a cover assembly that is easy to assemble, absorbs external loads, dampens vibration, reduces acoustic noise transmission and compensates for tolerances in the assembly.

It should be understood that the relative dimensions and geometric shapes shown in FIG. 3 are exemplary of one embodiment of the present invention only. Other embodiments may utilize different dimensions, shapes, materials, etc., to achieve substantially the same result.

With reference to FIG. 4, an alternative embodiment of the present invention is shown which includes all of the basic elements of the embodiment of FIG. 3, except that the design of the mounting member is modified. In the embodiment of FIG. 4, mounting member 14 has a cylindrical shape and a rectangular cross-section that rests in orifice 30 as illustrated in FIG. 4. The spindle shaft 17 is coupled to cover 10 in the same manner as described for the embodiment of FIG. 3. Alternatively, mounting member 14 may be molded or bonded to cover 10 before the cover is attached to baseplate 16. In addition, shaft mount 14 may be constructed from a pressure sensitive adhesive material.

In the embodiment of FIG. 5 a different configuration is shown which includes the basic elements of the embodiments of FIG. 3 and 4, except that the design of the cover is modified. In the embodiment of FIG. 5, a cover 20 is provided that does not include a recessed region, but instead has a flat inside surface 23. The spindle shaft 17 is secured to cover 20 by first placing mounting member 21 into orifice 30. Cover 20 is then attached to baseplate 16 to form the drive unit enclosure. The combined length of spindle shaft 17 and mounting member 21, in the uncompressed state, is larger than the distance between the inside surface 23 of cover 20 and the inside surface of base plate 16, so that shaft mount 20 is compressed between surfaces 22 and 23 when cover 20 is attached to baseplate 16.

Figure 6:
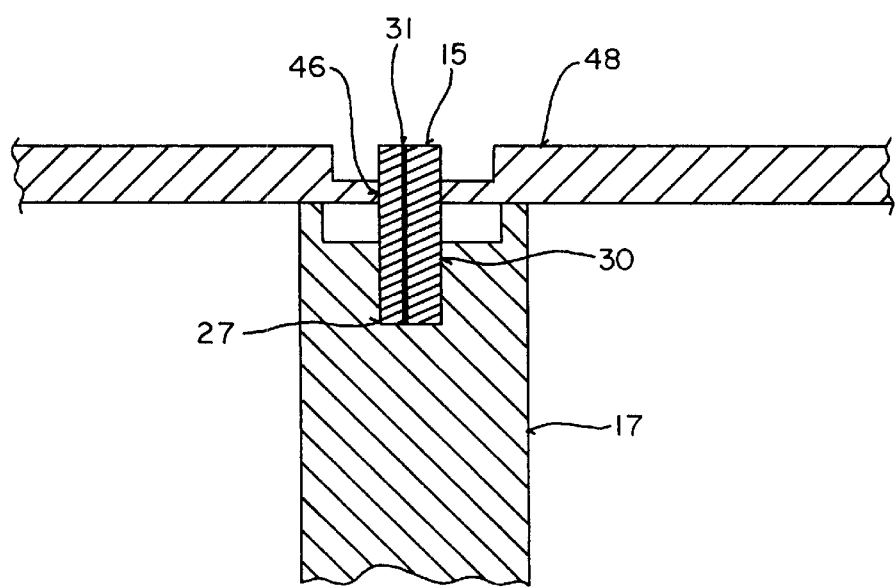
FIG. 6 is a cross-sectional view of still another embodiment of the elastomeric mount of the present invention.

In the embodiment of FIG. 6, a different configuration is shown including all the basic elements of the previous embodiments, except that the mounting member and drive assembly cover are modified. Spindle shaft 17 includes an orifice 30 located at one end of shaft 17. Orifice 30 is disposed along a central, longitudinal axis of shaft 17 and includes a seating surface 27. At a location directly above orifice 30, a through opening 46 is provided in cover 48.

In the embodiment of FIG. 6, orifice 30 and through opening 46 are provided to accommodate mounting member 15. Mounting member 15 preferably comprises an elastomeric material having a cylindrical shape and a rectangular cross-section. During the process of assembling the disk drive unit, cover 48 is attached to baseplate 16. Spindle shaft 17 is then coupled to cover 48 by press fitting mounting member 15 into cover opening 46 and orifice 30 such that mounting member 15 sits on surface 27 and extends upward through cover opening 46. Next, rigid pin 31 is inserted through the center of mounting member 15 causing it to expand. A tight fit is thus created between the radial surface of mounting member 15 and the surfaces of through opening 46 and orifice 30, thereby securing spindle shaft 17 to cover 48. It should be noted that the fit created between mounting member 15 and cover opening 46 is sufficient to seal the cover opening, thereby preventing environmental debris from entering the drive assembly.

With continuing reference to FIG. 6, spindle shaft 17 is shown coupled to cover 48 by mounting member 15. Mounting member 15 preferably comprises a resilient, elastomeric material that is sufficiently rigid to laterally constrain the spindle assembly when the drive is subjected to an external load, yet flexible enough to dampen environmental vibrations and acoustic noise.

Whereas many alternations and modifications to the present invention will no doubt become apparent to the person of ordinary skill in the art after having read the foregoing description, it is to be understood that the particular embodiments shown and described by way of illustration are in no way intended to be limiting. Therefore, reference to the details of the illustrated diagrams is not intended to limit the scope of the claims which themselves recite only those features regarded as essential to the invention.

I claim:

1. A hard disk drive assembly comprising: an enclosure having first and second lateral surfaces, said first and second lateral surfaces being substantially parallel to one another;

a spindle shaft supporting a motor for rotating one or more magnetic disks about said spindle shaft, said spindle shaft having first and second ends, said spindle shaft being fixedly coupled at said first end to said first lateral surface of said enclosure, and said spindle shaft being coupled at said second end to said second lateral surface of said enclosure, said second end of said spindle shaft having an orifice therein; and a damping mounting member constraining said spindle shaft at said second end, said damping member coupled adjacent said second end of said spindle shaft and compressed against at least a portion of said second lateral surface so as to avoid shearing of said end of said spindle shaft with respect to said second lateral surface in response to external shock.

2. The assembly as recited in claim 1, wherein said orifice has a substantially stepped cylindrical shape and a T cross-section.

3. The assembly as recited in claim 1, wherein said mounting member comprises an elastomeric material.

4. The assembly as recited in claim 3, wherein said mounting member comprises a pressure sensitive adhesive material.

5. The assembly as recited in claim 2, wherein said mounting member has a substantially stepped cylindrical shape and a T cross-section.

6. The assembly as recited in claim 2, wherein said mounting member has a substantially cylindrical shape and a rectangular cross-section.

7. A hard disk drive assembly comprising:

an enclosure having first and second lateral surfaces, said first and second lateral surfaces being substantially parallel to one another, said second lateral surface having a recessed region;

a spindle shaft supporting a motor for rotating one or more magnetic disks about said spindle shaft, said spindle shaft having first and second ends, said spindle shaft being fixedly coupled at said first end to said first lateral surface, and at said second end to said second lateral surface, said spindle shaft having an axial orifice positioned within said second end of said spindle shaft; and a damping mounting member constraining said spindle shaft at said second end disposed at least partially within said axial orifice and at least partially within said recessed region.

8. The assembly as recited in claim 7, wherein said orifice has a substantially stepped cylindrical shape and a T cross-section.

9. The assembly as recited in claim 7, wherein said mounting member comprises an elastomeric material.

10. The assembly as recited in claim 8, wherein said mounting member has a substantially stepped cylindrical shape and a T cross-section.

11. The assembly as recited in claim 8, wherein said mounting member has a substantially cylindrical shape and a rectangular cross-section.

12. A hard disk drive assembly comprising:

a baseplate;

a cover;

a spindle shaft supporting a motor for rotating one or more magnetic disks about said spindle shaft, said spindle shaft having a first end and a second end, said second end defining a second end perimeter, said spindle shaft being fixedly coupled at said first end to said baseplate, and said spindle shaft being coupled at said second end to said cover;

said cover being attached to said baseplate to enclose said spindle shaft and said disks therebetween; and a damping mounting member constraining said spindle shaft at said second end, at least a portion of said damping member positioned within said second end perimeter and compressed against said cover during normal operation.

13. The assembly as recited in claim 12, wherein said second end has an orifice which has a substantially stepped cylindrical shape and a T cross-section.

14. The assembly as recited in claim 12, wherein said mounting member comprises a pressure sensitive adhesive material.

15. The assembly as recited in claim 13, wherein said mounting member has a substantially stepped cylindrical shape and a T cross-section.

16. The assembly as recited in claim 13, wherein said mounting member has a substantially cylindrical shape and a rectangular cross-section.

17. A hard disk drive assembly comprising:

a baseplate;

a cover having a recessed region;

a spindle shaft supporting a motor for rotating one or more magnetic disks about said spindle shaft, said spindle shaft having first and second ends, said spindle shaft being fastened at said first end to said baseplate;

said cover being attached to said baseplate to enclose said spindle shaft and said disks therebetween; and a damping mounting member constraining said spindle shaft at said second end compressed between said orifice and said recessed region during normal operation.

18. The assembly as recited in claim 17, wherein said orifice has a substantially stepped cylindrical shape and a T cross-section.

19. The assembly as recited in claim 18, wherein said mounting member has a substantially stepped cylindrical shape and a T cross-section.

20. The assembly as recited in claim 18, wherein said mounting member has a substantially cylindrical shape and a rectangular cross-section.

* * * * *